United States Patent
Miyazaki et al.

[11] Patent Number: 4,678,651
[45] Date of Patent: *Jul. 7, 1987

[54] PROCESS FOR PREPARATION OF FAUJASITE ZEOLITE

[75] Inventors: Hiroshi Miyazaki, Shinnanyo; Junji Arika, Tokuyama; Michiyuki Aimoto, Kudamatsu, all of Japan

[73] Assignee: Toyo Soda Manufacturing Co., Ltd., Shinnanyo, Japan

[*] Notice: The portion of the term of this patent subsequent to May 6, 2003 has been disclaimed.

[21] Appl. No.: 753,998

[22] Filed: Jul. 11, 1985

[30] Foreign Application Priority Data

Jul. 11, 1984 [JP] Japan .................... 59-142289

[51] Int. Cl.$^4$ .................................. C01B 33/28
[52] U.S. Cl. .................... 423/329; 423/328; 502/60; 502/79
[58] Field of Search ............ 423/329, 328; 502/79

[56] References Cited

U.S. PATENT DOCUMENTS

| | | | |
|---|---|---|---|
| 3,433,589 | 3/1969 | Ciric et al. | 423/329 |
| 3,639,099 | 2/1972 | Elliott et al. | 423/329 |
| 4,178,352 | 12/1979 | Vaughan et al. | 423/329 |
| 4,314,979 | 2/1982 | Deabriges | 423/329 |
| 4,376,106 | 3/1983 | Miyanohora et al. | 423/328 |
| 4,530,824 | 7/1985 | Arika et al. | 423/328 |
| 4,562,055 | 12/1985 | Arika et al. | 423/328 |
| 4,587,115 | 5/1986 | Arika et al. | 502/79 |

Primary Examiner—John Doll
Assistant Examiner—Jackson Leeds
Attorney, Agent, or Firm—Cushman, Darby & Cushman

[57] ABSTRACT

A faujasite zeolite of a high purity and a desired silica/alumina ratio is prepared by crystallizing at an elevated temperature a reaction mixture comprising a silica source, an alumina source, and an alkali metal source, wherein a transparent faujasite germ solution obtained by mixing and aging aqueous alkali metal silicate solution, an aqueous alkali metal aluminate solution and an aqueous alkali metal hydroxide solution is made present in the reaction mixture. The faujasite germ solution has an oxide molar composition represented by the following molar ratios:

$SiO_2/Al_2O_3 = 8$ to $14$, $M_2O/Al_2O_3 = 7$ to $30$, and $H_2O/M_2O = 10$ to $14$, wherein M represents an alkali metal.

The amount of the faujasite germ solution is 1 to 30 wt. % as $Al_2O_3$ based on the faujasite zeolite.

3 Claims, 1 Drawing Figure

PROCESS FOR PREPARATION OF FAUJASITE ZEOLITE

BACKGROUND OF THE INVENTION (1) Field of the Invention

The present invention relates to a process in which a faujasite zeolite, especially a faujasite zeolite having a high silica/alumina ratio, can be easily prepared. More particularly, it relates to a process for the preparation of a faujasite zeolite, which comprises heating and crystallizing a reaction mixture comprising a silica source, an alumina source, and an alkali metal source, wherein a transparent faujasite germ solution obtained by mixing and aging an aqueous solution of an alkali metal aluminate, an aqueous solution of an alkali metal silicate, and an aqueous solution of an alkali metal hydroxide is made present in the reaction mixture.

(2) Description of the Related Art

A faujasite zeolite ordinarily has an oxide molar composition represented by the following formula:

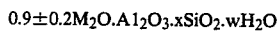

$$0.9 \pm 0.2 M_2O \cdot Al_2O_3 \cdot xSiO_2 \cdot wH_2O$$

wherein M represents an alkali metal cation, x is a number of from 2.5 to 6, and w is a number of from 6 to 9.

Faujasite zeolites are used as a cracking catalyst for refining petroleum in the field of the petrochemical industry or the like, and as an adsorptive separating agent for use in the separation of paraxylene or the like. Ordinarily, these catalysts or adsorptive separating agents are required to have high solid acid strength, good heat resistance and acid resistance. In the case of a faujasite zeolite, the $SiO_2/Al_2O_3$ molar ratio has a close relationship to these properties, and in a faujasite zeolite having a higher $SiO_2/Al_2O_3$ molar ratio these properties are excellent.

A faujasite zeolite having a relatively low silica ratio, that is, an $SiO_2/Al_2O_3$ molar ratio of 2.5 to 4, has a poor heat resistance and acid resistance because of this low silica molar ratio. Therefore, faujasite zeolites having an $SiO_2/Al_2O_3$ molar ratio of at least 4 are widely used industrially and high-silica faujasite zeolites having an $SiO_2/Al_2O_3$ molar ratio of at least 4.5 are especially desired. However, it has been considered difficult to synthesize faujasite zeolites having an $SiO_2/Al_2O_3$ molar ratio of at least 4.5, especially at least 5. In the synthesis of such faujasite zeolites, the intended zeolites are produced only under very restricted conditions. Accordingly, the kinds and quantitative ratios of starting materials should be strictly and carefully selected and the reaction should be carefully carried out while strictly controlling such conditions as the mixing state, the degree of aging, the reaction temperature, and the reaction time. These difficulties are increased particularly when it is intended to prepare a faujasite zeolite having a high purity.

Various processes have heretofore been proposed for preparing high-silica faujasite zeolites. According to a typical process disclosed in Japanese Examined Patent Publication No. 36-1639 or No. 42-16941, a silica source such as silica sol, silica gel, or finely divided solid silicic acid, sodium aluminate and sodium hydroxide are used as the starting materials and these starting materials are reacted under strictly controlled conditions to form a faujasite zeolite having an $SiO_2/Al_2O_3$ molar ratio of at least 4. In this process, however, it is indispensable that expensive amorphous solid silica should be used as the silica source, and after the mixing of the silica source, alumina source and alkali metal source, aging should be conducted for a long time, and crystallization then conducted at a high temperature. Therefore, a faujasite zeolite cannot be produced at a low cost.

Furthermore, a fatal defect is encountered when it is intended to synthesize a faujasite zeolite on an industrial scale with a good reproducibility. Namely, it is impossible to carry out the reaction while stirring and mixing the reaction system. Especially, when stirring is effected at the step of converting an amorphous reaction product of an aqueous gel, formed through long-time aging after mixing of the starting materials, to a faujasite zeolite, crystallization to the intended faujasite zeolite is inhibited and the majority of the product is converted to an aluminosilicate mineral of no practical utility such as naturally occurring phillipsite mineral analogues (hereinafter referred to as "phillipsite") and gmelinite. Accordingly, in order to synthesize a high-silica faujasite zeolite having a high purity, it is indispensable that the synthesis should be carried out while the reaction mixture in the form of an aqueous gel is allowed to stand, and mixing under stirring should be avoided. However, if this synthesis process under the stationary condition is carried out on an industrial scale, stirring required to effect the heat transfer for maintaining the reaction temperature is not conducted, and thus the heat transfer in the reaction system becomes difficult and the temperature becomes uneven, resulting in a disadvantage such as the simultaneous formation of phillipsite and gmelinite. Various means are adopted for avoiding the simultaneous formation of phillipsite and gmelinite in the above-mentioned stationary synthesis process, but the problem of the simultaneous formation of phillipsite and gmelinite has not been completely solved.

Moreover, as means for reducing the manufacturing cost of a high-silica faujasite zeolite, there have been proposed various improved processes. For example, Japanese Examined Patent Publication No. 47-4866 discloses a process for preparing a faujasite zeolite having an $SiO_2/Al_2O_3$ molar ratio of at least 4 by using as the silica source cheap sodium silicate which has been considered to be unable to give a high-silica faujasite zeolite, wherein an amorphous nucleus-forming core substance (seed) which has been prepared in advance and has an average particle size of 0.01 to 0.1 μm is added to a reaction mixture comprising sodium silicate, sodium aluminate, and aluminum-sulfate.

Moreover, Japanese Examined Patent Publication No. 53-33556 discloses a process for preparing a faujasite zeolite having an $SiO_2/Al_2O_3$ molar ratio of 4.5, wherein a zeolite seed prepared in advance from an aqueous mixture of sodium silicate and sodium aluminate is added to a mixture of silica and alumina sources.

In each of these known processes, specific means such as the addition of an amorphous or crystalline seed is adopted so as to obtain a high-silica faujasite zeolite from a cheap silica source such as sodium silicate. However, synthesis under stirring, which will make large-scale production possible, cannot be realized in these known processes, though the manufacturing cost has been reduced in these improved processes by using a cheap silica source.

SUMMARY OF THE INVENTION

In view of the foregoing, it is a primary object of the present invention to provide a process for the preparation of a faujasite zeolite, by which a faujasite zeolite having a desired silica/alumina ratio and a high purity can be advantageously prepared. By the process of the present invention, the faujasite zeolite is prepared on a large production-scale and with a good reproducibility. In addition all of silica sources, inclusive of an aqueous solution of an alkali metal silicate which has been considered difficult to use for the synthesis of a high-silica faujasite zeolite, can be used as the starting material and stirring mixing reaction, which cannot be adopted in the conventional processes, can be substantially carried out.

In accordance with the present invention, there is provided a process for the preparation of a faujasite zeolite, which comprises crystallizing at an elevated temperature a reaction mixture comprising a silica source, an alumina source, and an alkali metal source, wherein a transparent faujasite germ solution obtained by mixing and aging an aqueous solution of an alkali metal silicate, an aqueous solution of an alkali metal aluminate, and an aqueous solution of an alkali metal hydroxide is made present in the reaction mixture, the faujasite germ solution having an oxide molar composition represented by the following oxide molar ratios:

$SiO_2/Al_2O_3 = 8$ to 14, $M_2O/Al_2O_3 = 7$ to 30, and $H_2O/M_2O = 10$ to 14, wherein M represents an alkali metal, and the amount of the faujasite germ solution is 1 to 30% by weight as $Al_2O_3$ based on the resulting faujasite zeolite.

DESCRIPTION OF THE PREFERRED EMBODIMENTS

Figure 1:
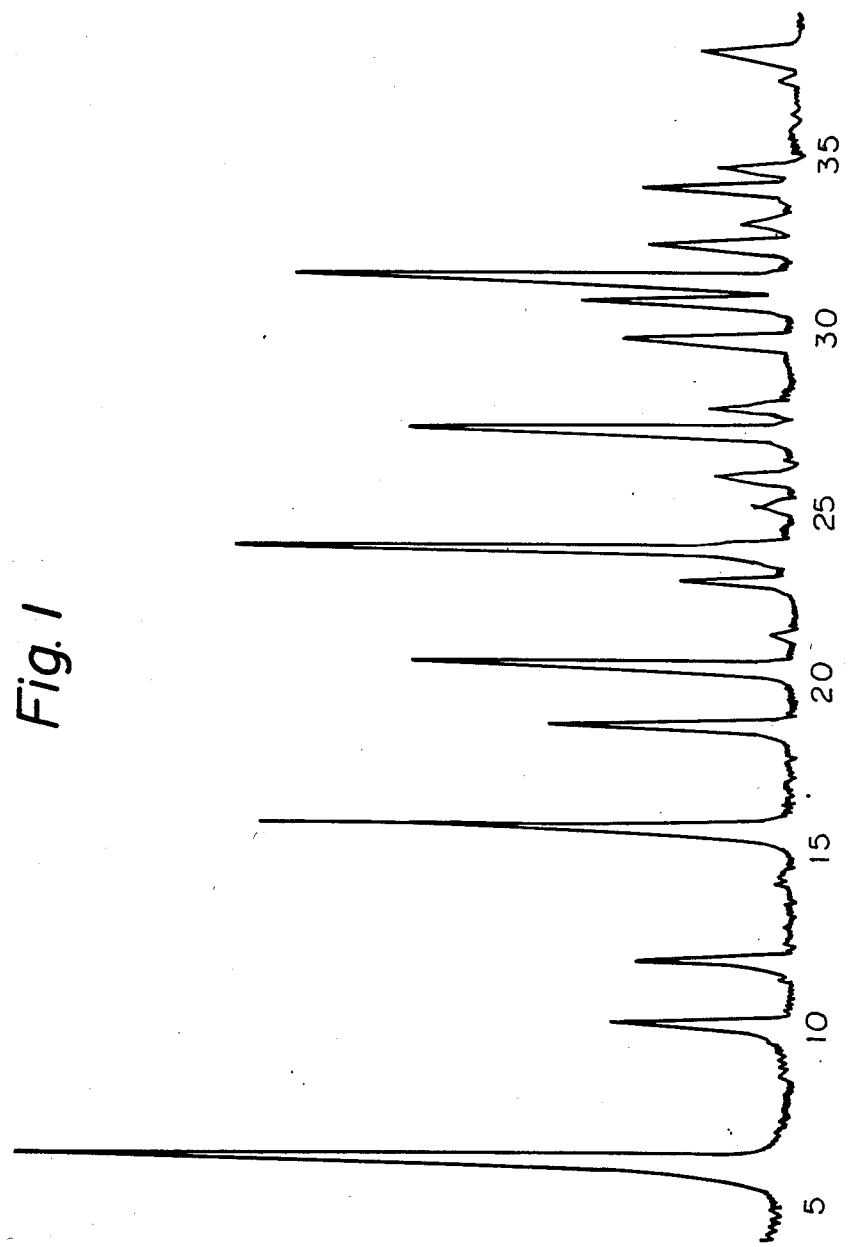
FIG. 1 shows an X-ray diffraction pattern (Cu-Kα) of the faujasite zeolite prepared in Example 1.

In the process of the present invention, long-time aging of a reation mixture at room temperature, which is indispensable in the conventional processes for production of a high-silica faujasite zeolite, is not required and the time for the step of crystallization at a high temperature can be greatly shortened. If it is taken into consideration that industrial working of conventional processes is unsatisfactory from the economical viewpoint and in view of the quality of the product and the operation, it will be readily understood that the present invention is very significant from the industrial viewpoint.

The transparent faujasite germ solution used in the present invention is a product obtained by mixing and aging an aqueous solution of an alkali metal silicate, an aqueous solution of an alkali metal aluminate, and an aqueous solution of an alkali metal hydroxide, in which an aluminosilicate substance is present in a state resembling a transparent solution, that is, in a solubilized state, and which is structurally different from a solid product such as an aqueous gel of an amorphous aluminosilicate formed immediately after mixing the above-mentioned silica source, alumina source, and alkali metal source.

By the term "transparent" used herein, is meant that the substance has a transmission of at least 80% to distilled water, as determined by the transmitted light method. The transparent faujasite germ solution used in the present invention is formed without the formation of a solid substance such as an aluminosilicate gel through the step of mixing and aging the starting aqueous solutions of an alkali metal silicate, an alkali metal aluminate, and an alkali metal hydroxide. If this faujasite germ solution is excessively aged, it is gradually rendered opaque to form a gel-like solid substance which is not suitable for attaining the object of the present invention. This phenomenon is irreversible and the faujasite germ solution is different from an aqueous solution from the viewpoint of the thermodynamic equilibrium.

In the present invention, this transparent faujasite germ solution is added to a reaction mixture obtained from a silica source, an alumina source, and an alkali metal source, which is used for the formation of a faujasite zeolite. This reaction mixture may be a known reaction mixture which has been customarily used, but it is preferred that the reaction mixture be a homogeneous phase mixture described hereinafter. It is considered that the faujasite germ solution acts as a crystallization inducer in the reaction of forming a crystal of a faujasite crystal. Formation of the faujasite zeolite crystal is promoted at a stroke and the simultaneous formation of impurities is prevented, and a high-silica faujasite zeolite having a high purity is formed with a good reproducibility.

In the conventional processes, a crystalline or amorphous seed acts as a nucleation material, but a part of the solid seed left in the system is converted to an impurity such as phillipsite by an external disturbance such as stirring and formation of this impurity is promoted by the residual seed. Accordingly, synthesis with stirring has been inhibited in the conventional processes. On the other hand, it has been found that the transparent faujasite germ solution used in the present invention is not converted to an impurity at all but is included in a newly formed faujasite crystal. It is considered that this effect is due to the fact that the majority of the mixed faujasite germ solution acts as a crystallization inducer in the liquid state. It is quite surprising that, by the use of this faujasite germ solution, it becomes possible to produce a high-purity and high-silica faujasite zeolite at a high efficiency with stirring with a good reproducibility.

The transparent faujasite germ solution having such peculiar properties is prepared according to the following method.

The composition of the faujasite germ solution is expressed by the following oxide molar ratios:

$SiO_2/Al_2O_3 = 8$ to 14, $M_2O/Al_2O_3 = 7$ to 30, and $H_2O/M_2O = 10$ to 14 wherein M represents an alkali metal.

As the starting aqueous solution of an alkali metal silicate, there are preferably used aqueous solutions of sodium silicate, potassium silicate, and lithium silicate. As the starting solution of an alkali metal aluminate, there is preferably used an aqueous solution of sodium aluminate. There may be used commercially available aqueous solutions of an alkali metal silicate and an alkali metal aluminate. Moreover, aqueous solutions formed by dissolving a silica source such as siliceous sand or hydrous solid silicic acid or an alumina source such as aluminum hydroxide or active alumina with alkali hydroxide may be used. An aqueous solution of sodium hydroxide is most preferred as the aqueous solution of an alkali metal hydroxide.

The order of adding and mixing the starting aqueous solutions is not particularly critical, but it is preferred that there be adopted a method in which an aqueous solution of an alkali metal hydroxide is mixed with an aqueous solution of an alkali metal aluminate, and then an aqueous solution of an alkali metal silicate is added to the mixture in as short a time as possible. When the order of the addition of the silica and alumina sources is reverse to the above-mentioned order, or when the time for the addition of the aqueous solution of an alkali metal silicate is excessively long in the above-mentioned adding and mixing method, a gel-like substance is undesirably temporarily formed.

The transparent faujasite germ solution used in the present invention can be obtained by aging the mixed aqueous solutions.

Aging is carried out at a temperature of 20° C. to 60° C., preferably 25° C. to 50° C., for 10 minutes to 6 hours, preferably 20 minutes to 4 hours, with stirring. If the aging operation is carried out under conditions other than those mentioned above and the aging degree is insufficient, a preferred transparent faujasite germ solution cannot be formed. If the aging degree is excessively high, a gel-like substance is formed, resulting in the formation of an impurity.

As the $H_2O/M_2O$ molar ratio is specified as 10 to 14 in the above-mentioned molar composition, the alkali concentration at the preparation of the faujasite germ solution is especially important. If the $H_2O/M_2O$ molar ratio is lower than 10, a transparent state can be maintained within the above-mentioned aging degree, but the formed faujasite germ solution is incomplete and the simultaneous formation of an impurity is readily caused in the synthesis of the faujasite zeolite. If the $H_2O/M_2O$ molar ratio is higher than 14, a gel-like substance is readily formed at the time of aging to cause the simultaneous formation of an impurity.

After completion of the aging, the faujasite germ solution is mixed with a faujasite zeolite-forming reaction mixture formed in advance from the silica, alumina, and alkali metal sources. The faujasite germ solution is added in an amount of 1 to 30% by weight, preferably 5 to 20% by weight, as $Al_2O_3$ based on the obtained faujasite zeolite. If the amount of the faujasite germ solution is smaller than 1% by weight, the crystal synthesis speed is low and synthesis with stirring becomes difficult. If the amount of the faujasite germ solution is too large and exceeds the necessary amount, the effect is not particularly increased but the amount of the alkali metal component becomes excessive in the faujasite zeolite-forming system, and a faujasite zeolite having an intended $SiO_2/Al_2O_3$ molar ratio cannot be obtained.

The transparent faujasite germ solution used in the present invention may be mixed with any of known faujasite zeolite-forming reaction mixtures. It is unexpected that by using this faujasite germ solution as a faujasite zeolite crystallization inducer, a cheap silica source such as an aqueous solution of an alkali metal silicate or diatomaceous earth can be used as the silica source constituting the reaction mixture.

As a preferred embodiment in which an aqueous solution of an alkali metal silicate is used as all of the silica source of the reaction mixture, there can be mentioned a method in which an aluminosilicate homogeneous phase compound obtained by continuously reacting an aqueous solution of an alkali metal silicate and an aluminum-containing aqueous solution while simultaneously feeding both aqueous solutions into reactor is used as the silica and alumina sources of the reaction mixture.

According to this method, an almminosilicate homogeneous phase compound having an optional composition can be easily obtained by controlling the feed rates of both aqueous solutions. Therefore, the composition can be freely set in compliance with the intended $SiO_2/Al_2O_3$ molar ratio of the faujasite zeolite.

This simultaneous and continuous reaction method will now be described with reference to typical embodiments.

By the term "simultaneous and continuous reaction" is meant a reaction which is carried out continuously while simultaneously supplying an aqueous solution of an alkali metal silicate and an aluminum-containing aqueous solution to a reaction zone, and maintaining a substantially constant ratio.

As the aqueous solution of an alkali metal silicate, there is preferably used an aqueous solution of sodium silicate, potassium silicate or lithium silicate. As the aluminum-containing aqueous solution, there is preferably used an aqueous solution of aluminum sulfate, aluminum chloride or sodium aluminate.

According to a preferred embodiment of the above-mentioned method for preparing an amorphous aluminosilicate homogeneous phase compound (hereinafter referred to as "homogeneous compound"), both aqueous solutions are simultaneously and continuously supplied to an overflow type reaction vessel equipped with a stirrer to effect the reaction. The average residence time is at least 3 minutes.

The homogenous compound obtained according to this method consists of substantially spherical particles, the substantial part, of which have a particle size in the range of from 1 to 500 $\mu$m. The proportion of fine particles having a size smaller than 1 $\mu$m is very small.

According to another embodiment of the method for the preparation of a homogeneous compound, there can be adopted a so-called batchwise continuous method in which both aqueous solutions are simultaneously and continuously supplied at a constant ratio to a reaction vessel with stirring. In this embodiment, it is preferred that both aqueous solutions be not added promptly but the necessary amounts of both the aqueous solutions be supplied over a period of at least 10 minutes.

The homogeneous compound prepared according to the above-mentioned method is characterized in that since both aqueous solutions are simultaneously and continuously supplied at a constant ratio, the formed substantially spherical homogeneous compound always has a uniform composition and no heterogenous portion is present in the product. Accordingly, when a faujasite zeolite-forming reaction mixture is prepared from this homogeneous compound having a uniform composition and the faujasite germ solution mentioned above is added to this reaction mixture as the faujasite zeolite crystallization inducing agent, since the reaction mixture contains no heterogeneous composition portion, crystallization is caused throughout the reaction mixture and simultaneous formation of an impurity due to the presence of a heterogeneous portion in the reaction mixture can be avoided.

The homogeneous compound is formed into the reaction mixture as it is in the obtained slurry state or after it is formed into a slurry having an optional concentration after filtration and washing. The alkali concentration may be adjusted in the reaction mixture by adding an aqueous solution of an alkali metal hydroxide, if desired.

Then, the reaction mixture is mixed with the above-mentioned transparent faujasite germ solution aged under predetermined conditions. The addition of the faujasite germ solution is completed in a short time, preferably within 10 minutes. If the mixing time is too long, the faujasite germ solution per se is excessively aged during the standing time.

At the step of adding the faujasite germ solution, the temperature of the reaction mixture is not particularly critical, and desired results are obtained if the temperature is within the range of from room temperature to the faujasite zeolite crystal-forming temperature. The starting crystal-forming mixture in which the faujasite germ solution is homogeneously incorporated is immediately subjected to crystallization by elevating the temperature.

In the present invention, crystallization can be carried out with stirring. Of course, crystallization may be carried out under standing-still conditions as in the conventional processes, if the reaction is carried out on a small scale.

The crystallization temperature is 75° C. to 130° C. The time required for crystallization depends on the temperature, but it is ordinarily 10 to 40 hours.

In order to obtain a high-silica faujasite zeolite, the ratio of the alkali metal component $M_2O$ to the alumina component $Al_2O_3$ in the faujasite zeolite-forming system is reduced. In contrast, in order to obtain a low-silica faujasite zeolite, the ratio of $M_2O$ to $Al_2O_3$ is increased.

After completion of the crystallization, the formed crystal is subjected to solid-liquid separation and washing to remove any excessive alkali metal component adhering to the crystal. The crystal is then dried, and a faujasite zeolite having a high purity can be obtained.

In the above-mentioned embodiment, an aqueous solution of an alkali metal silicate, which is considered difficult to use for the synthesis of a high-silica faujasite zeolite in the conventional processes, is used as the starting silica source for the preparation of the reaction mixture. Of course, in the present invention, it is possible to use all customarily used silica sources, such as silica sol, silica gel, finely divided solid silicic acid, and diatomaceous earth. Even if these silica sources are used, by using the above-mentioned transparent faujasite germ solution, long-time aging of the reaction mixture at room temperature, which is indispensable for the production of a high-silica faujasite zeolite in the conventional processes, becomes unnecessary as in the above-mentioned embodiment, and synthesis with stirring, which is impossible in the conventional processes, becomes possible.

The present invention provides a process in which a high-silica faujasite zeolite having an $SiO_2/Al_2O_3$ molar ratio of at least 4.5, synthesis, a good reproducibility of which on an industrial scale has heretofore been considered difficult, can be easily and economically advantageously prepared on a large scale. Furthermore, the present invention can be applied to synthesis of a low-silica faujasite zeolite. Also in this case, synthesis with stirring is possible as in the case of the synthesis of a high-silica faujasite zeolite, and the crystallization time can be greatly shortened.

According to the present invention, faujasite zeolites having a high purity and an $SiO_2/Al_2O_3$ molar ratio included within a broad range of from 2.5 to 6.3 can be advantageously prepared. Therefore, the present invention can be applied to the preparation of products to be used in various fields, especially adsorbing agents and catalysts.

The present invention will now be described in detail with reference to the following examples.

REFERENCE EXAMPLE 1

(PREPARATION OF FAUJASITE GERM SOLUTION)

This example illustrates the process for the preparation of a transparent faujasite germ solution.

In a stirring tank equipped with a paddle type stirrer and a jacket, 866 g of sodium hydroxide (NaOH content =98% by weight) was dissolved in 1528 g of pure water, and the solution was cooled to 30° C. 492 g of an aqueous solution of sodium aluminate ($Al_2O_3$ content =20.1% by weight and $Na_2O$ content =18.6% by weight) was added to the aqueous sodium hydroxide solution, and the mixture was sufficiently stirred.

Then, 2076 g of an aqueous solution of sodium ($SiO_2$ content =28.9% by weight, $Na_2O$ content =9.6% by weight, $Al_2O_3$ content =0.15% by weight) was added to the above mixture at a constant rate over a period of 5 minutes. Aging was then carried out with stirring for 3 hours at an ambient temperature of 30° C. Aging was completed without opacification and a transparent faujasite germ solution was obtained. When the transmission of the aged transparent faujasite germ solution was measured by using a colorimeter (Spectronic 20 supplied by Shimazu Seisakusho) at a wavelength of 660 mμ, it was found that the transmission was 93% based on that of deionized water designated as 100%. The molar composition of the faujasite germ solution was expressed by the following oxide molar ratios:

$SiO_2/Al_2O_3 = 10.00$, $Na_2O/Al_2O_3 = 15.30$ $H_2O/Na_2O = 12.00$

This faujasite germ solution was added to the reaction mixture just after completion of the aging.

EXAMPLE 1

An ordinary external heating type reaction vessel equipped with a paddle type stirrer was charged with 2 l of pure water and the temperature was maintained at 60° C.

Then 2 l of an aqueous solution of aluminum sulfate ($Al_2O_3$ content =98.9 g/l, $H_2SO_4$ content =285.2 g/l) maintained at 60° C. and 6 of an aqueous solution of sodium silicate ($SiO_2$ content =200 g/l, $Na_2O$ content =80.8 g/l, $Al_2O_3$ content =1.03 g/l) maintained at 60° C. were simultaneously and continuously supplied at a constant ratio over a period of 40 minutes. The pH value of the liquid reaction mixture was 6.5 and the reaction temperature was 62° C. After the reaction, the slurry product was subjected to solid-liquid separation by using a centrifugal separator. The recovered solid was washed with water until no $SO_4=$ ion was detected in the washing filtrate, to obtain a homogeneous compound having a composition of $Na_2O = 3.25\%$ by weight, $Al_2O_3 = 5.34\%$ by weight, and $SiO_2 = 31.45\%$ by weight on the wet base.

Then, an external heating type reaction vessel equipped with an ordinary paddle type stirrer and reflux condenser on the top was charged with 442 g of pure water. 1643 g of the homogeneous compound was added to the water and the mixture was stirred to form a slurry of a reaction mixture.

Then, 693 g of the transparent faujasite germ solution prepared in Reference Example 1 was added to the reaction mixture slurry over a period of 2 minutes, and the mixture was stirred at 30° C. for 1 hour. The amount of the faujasite germ solution added was 14% by weight as $Al_2O_3$ based on the faujasite zeolite to be formed.

The starting slurry for crystallization, in which stirring mixing was completed, was maintained at an ambient temperature of 92° C. with stirring for 18 hours to effect crystallization.

After completion of the crystallization, the product was separated the mother liquor by filtration, and the product was washed with water and dried at 110° C.

From the results of the X-ray diffractometry, it was found that the product was a faujasite zeolite having an $SiO_2/Al_2O_3$ molar ratio of 5.5 and a crystallization degree of 104%. The $SiO_2/Al_2O_3$ molar ratio was determined by measuring the lattice constant by the X-ray diffractometry (this molar ratio was determined in the same way in the subsequent examples). The degree of crystallization was determined by measuring the sum $I_1$ of the intensities of the following crystal planes from the X-ray diffraction pattern:

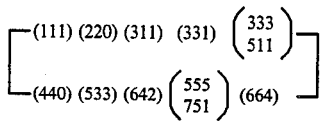

and calculating the ratio (%) of $I_1$ to the sum $I_2$ of the intensities of Y type Zeolite SK-40 supplied by Union Carbide Corporation. Namely, the crystallization degree was calculated according to the following formula (the crystallization degree was similarly determined in the subsequent examples, except for Example 4 and Comparative Example 4):

Crystallization degree(%) = $(I_1/I_2)$ × 100

The X-ray powder diffraction pattern obtained by using $CuK\alpha$ rays is shown in FIG. 1.

EXAMPLE 2

The procedures of Example 1 were repeated in the same manner except that the crystallization was carried out while the reaction mixture was allowed to stand. It was found from the results of the X-ray diffractometry that the obtained dry product was a faujasite zeolite having an $SiO_2/Al_2O_3$ molar ratio of 5.5 and a crystallization degree of 105%.

EXAMPLE 3

The starting slurry for crylstallization was prepared in the same manner as describe in Example 1 except that the amount of transparent faujasite germ solution obtained by the method described in Reference Example 1 was changed to 581 g, which corresponded to 11.7% by weight as $Al_2O_3$.

The starting slurry was stirred at 30° C. for 1 hour. Then, the temperature was elevated and the slurry was maintained at an ambient temperature of 92° C. with stirring for 30 hours to effect crystallization. After completion of the crystallization, the product was separated from the mother liquor by filtration, and the product was washed with water and dried at 110° C.

From the results of the X-ray diffractometry, it was found that the product was a faujasite zeolite having an $SiO_2/Al_2O_3$ molar ratio of 6.1 and a crystallization degree of 112%.

EXAMPLE 4

The same external heating type reaction vessel as used in Example 1 was charge with 0.72 l of pure water, and 2.3 l of an aqueous solution of sodium aluminate ($Al_2O_3$ content = 298.6 g/l, Na2O content = 277.1 g/l) maintained at 30° C. and 7.3 l of an aqueous solution of sodium silicate ($SiO_2$ content = 161.1 g/l, $Na_2O$ content = 53.1 g/l, $Al_2O_3$ content = 0.8 g/l) maintained at 30° C. were simultaneously and continuously supplied at a constant ratio over a period of 120 minutes and reaction was carried out with stirring. The reaction liquid (slurry) had a composition of $Na_2O = 8.20\%$ by weight, $Al_2O_3 = 5.56\%$ by weight, $SiO_2 = 9.34\%$ by weight, and $H20 = 76.9\%$ by weight. The temperature of the slurry after completion of the reaction was 32° C.

Subsequently, 99 g of the transparent faujasite germ solution prepared by the method described in Reference Example 1 was added to the slurry product without isolation thereof over a period of 1 minute, and then the mixture was stirred at 30° C. for 1 hour. The amount of the faujasite germ solution was 2% by weight as $Al_2O_3$ based on the faujastite zeolite to be formed. The temperature of the starting slurry for crystallization, in which mixing was completed, was elevated, and the slurry was maintained at an ambient temperature of 95° C with stirring for 4 hours to effect crystallization. After completion of the crystallization, the product was separated from the mother liquor, washed with water and dried at 110° C.

From the results of the X-ray diffractometry, it was found that the product was a faujasite zeolite having an $SiO_2/Al_2O_3$ molar ratio of 2.5 and a crystallization degree of 102% based on that of X type Zeolite 13X supplied by Union Carbide Corporation (the crystallization degree in Comparative Example 4 was determined in the same manner as described above).

EXAMPLE 5

The same external heating type reaction vessel as used in Example 1 was charged with 1796 g of pure water, and 15.5 g of sodium hydroxide (NaOH content = 98% by weight), 424 g of an aqueous solution of sodium aluminate ($Al_2O_3$ content = 20.1% by weight, $Na_2O$ content = 18.6% by weight), and 588 g of commercially available white carbon ($SiO_2$ content = 87.7% by weight, $Al_2O_3$ content = 0.5% by weight), which was finely divided amorphous silica, as the silica source, were added in the recited order to obtain a viscous reaction mixture slurry having a composition of $Na_2O = 3.21\%$ by weight, $Al_2O_3 = 3.11\%$ by weight, $SiO_2 = 18.26\%$ by weight and $H_2O = 75.08\%$ by weight.

Then, 693 g of the transparent faujasite germ solution prepared by the method described in Reference Example 1 was added to the mixture slurry over a period of 2 minutes. The mixture was stirred at 30° C. for 1 hour. The amount of the faujasite germ solution corresponded to 14% by weight as $Al_2O_3$ based on the faujasite zeolite to be formed as in Example 2.

Then, the temperature of the starting slurry for crystallization, in which mixing was completed, was elevated, and the slurry was maintained at an ambient temperature of 92° C. with stirring for 36 hours to effect crystallization. After completion of the crystallization, the product was separated from the mother liquor by filtration, washed with water and dried at 110° C. From the results of the X-ray diffractometry, it was found that the product was a faujasite zeolite having an $SiO_2/Al_2O_3$ molar ratio of 5.1 and a crystallizatio of 100%.

EXAMPLE 6

The same external heating type reaction vessel as used in Example 1 was charged with 1875 g of pure water, and 35.7 g of sodium hydroxide (NaOH content =98% by weight), 341 g of an aqueous solution of sodium aluminate ($Al_2O_3$ content =20.1% by weight, $Na_2O$ content =18.6% by weight), and 572 g of commercially available diatomaceous earth ($SiO_2$ content =90.16% by weight, $Al_2O_3$ content =3.4% by weight) as the silica source were added in the recited order to obtain a viscous reaction mixture slurry having a composition of $Na_2O$ =3.21% by weight, $Al_2O_3$ =3.11% by weight, $SiO_2$ =18.26% by weight, and $H_2O$ =75.08% by weight.

Then, 693 g of the transparent faujasite germ solution prepared by the method described in Reference Example 1 was added to the mixture slurry over a period of 2 minutes. The mixture was stirred at 30° C. for 5 hours. The amount of the faujasite germ solution corresponded to 14% by weight as $Al_2O_3$ based on the faujasite zeolite to be formed.

Then, the temperature of the starting slurry for crystallization, in which mixing was completed, was elevated, and the slurry was maintained at an ambient temperature of 92° C. with stirring for 40 hours to effect crystallization. After completion of the crystallization, the product was separated from the mother liquor by filtration. washed with water and then dried at 110° C. From the results of the X-ray diffractometry, it was found that the product was a faujasite zeolite having an $SiO_2/Al_2O_3$ molar ratio of 5.0 and a crystallization degree of 90%.

EXAMPLE 7

A transparent faujasite germ solution having the same composition as that of the faujasite germ solution obtained in Reference Example 1 and having a transmission of 90% was prepared in the same manner as described in Reference Example 1 except that aging of the starting mixture was conducted at an ambient temperature of 40° C. for 1 hour. A dry product was obtained in the same manner as described in Example 1 except that this faujasite germ solution was used as the crystallization inducing agent. From the results of the X-ray diffractometry, it was found that the product was a faujasite zeolite having an $SiO_2/Al_2O_3$ molar ratio of 5.5 and a crystallization degree of 105%.

EXAMPLE 8

The same external heating type reaction vessel as used in Example 1 was charged with 612 g of pure water, and 105 g of sodium hydroxide (NaOH content =98% by weight) and 1815 g of the homogeneous compound prepared by the same method as described in Example 1 were added in the recited order to obtain a reaction mixture slurry. Subsequently, 248 g of the transparent faujasite germ solution prepared by the same method as described in Reference Example 1 was added to the reaction mixture slurry over a period of 2 minutes. The mixture was stirred at 30° C. for 3 hours. The amount of the faujasite germ solution corresponded to 5% by weight as $Al_2O_3$ based on the faujasite zeolite to be formed.

Then, the temperature of the starting slurry for crystallization, in which mixing was completed, was elevated, and the slurry was maintained at an ambient temperature of 92° C. with stirring for 24 hours to effect crystallization. After completion of the crystallization, the product was separated from the mother liquor by filtration, washed with water and then dried at 110° C. From the results of the X-ray diffractometry, it was found that the product was a faujasite zeolite having an $SiO_2/Al_2O_3$ molar ratio of 5.6 and a crystallization degree of 101%.

EXAMPLE 9

A transparent faujasite germ solution having the same composition as that of the faujasite germ solution prepared in Reference Example 1 and having a transmission of 95% was prepared in the same manner as described in Reference Example 1 except that aging of the starting mixture was carried out at an ambient temperature of 25° C. for 1 hour. A dry product was prepared in the same manner as described in Example 1 except that this faujasite germ solution was used as the crystallization inducing agent. From the results of the X-ray diffractometry, it was found that the product was a faujasite zeolite having an $SiO_2/Al_2O_3$ molar ratio of 5.4 and a crystallization degree of 91%.

COMPARATIVE EXAMPLE 1

A faujasite germ solution having the same composition as that of the faujasite germ solution obtained in Reference Example 1 was prepared in the same manner as described in Reference Example 1 except that aging of the starting mixture was carried out at an ambient temperature of 30° C. for 6 hours. A gel-like substance was formed partially in the faujasite germ solution, and the faujasite germ solution had a transmission of 45% and was opaque.

A dry product was prepared in the same manner as described in Example 1 except that this faujasite germ solution was used as the crystallization inducing agent. From the results of the X-ray diffractometry, it was found that gmelinite and phillipsite were simultaneously formed and the crystallization degree of the faujasite zeolite was 82%.

COMPARATIVE EXAMPLE 2

A faujasite germ solution was prepared in the same manner as described in Reference Example 1 except that the amount of pure water used was changed to 2623 g. A large amount of a gel-like product was formed. The faujasite germ solution had a composition of $SiO_2/Al_2O_3$ =10.00, $Na_2O/SiO_2$ =1.53 and $H_2O/Na_2O$ =16.00. The faujasite germ solution had a transmission of 32% and was opaque.

Then, 848 g of the opaque faujasite germ solution was added over a period of 2 minutes to a reaction mixture slurry formed by adding 1643 g of the homogeneous compound having the same composition as that of the homogeneous compound used in Example 1 to 289 g of pure water in the same external heating type reaction vessel as used in Example 1. The mixture was stirred at 30° C. for 1 hour. The amount of the faujasite germ solution corresponded to 14% by weight as $Al_2O_3$ as in Example 1. The crystallization and post treatment were carried out in the same manner as described in Example 1 to obtain a dry product. From the results of the X-ray diffractometry, it was found that gmelinite was simultaneously formed and the crystallization degree of the faujasite zeolite was 75%.

COMPARATIVE EXAMPLE 3

A faujasite germ solution having the same composition as that of the faujasite germ solution obtained in reference Example 1 was prepared in the same manner as described in Reference Example 1 except that aging was carried out at an ambient temperature of 70° C. for 2 hours. A large amount of a gel-like substance was formed, and the transmission of the obtained faujasite germ solution was 30% and the faujasite germ solution was opaque.

A dry product was prepared in the same manner as described in Example 1 except that this faujasite germ solution was used as the crystallization inducing agent. From the results of the X-ray diffractometry, it was found that large amounts of gmelinite and phillipsite were simultaneously formed and the crystallization degree of the faujasite zeolite was 57%.

COMPARATIVE EXAMPLE 4

A dry product was prepared in the same manner as described in Example 4 except that the transparent faujasite germ solution was not used. From the results of the X-ray diffractometry, it was found that a large amount of phillipsite was simultaneously formed and the crystallization degree of the faujasite zeolite was 50%.

COMPARATIVE EXAMPLE 5

To 4338 g of water were added 348 g of sodium hydroxide (NaOH content =98% by weight), 980 g of an aqueous solution of sodium aluminate ($Al_2O_3$ content =20.1% by weight, $Na_2O$ content =18.6% by weight), and 1368 g of commercially available white carbon ($SiO_2$ content =87.7% by weight, $Al_2O_3$ content =0.5% by weight) in the recited order, whereby a starting slurry for crystallization having the same composition as that of the slurry used in Example 5 was obtained.

A part of the slurry was charged in a sealed vessel and allowed to stand at an ambient temperature of 92° C. for 36 hours to effect crystallization. The remainder of the slurry was charged in the same external heating type reaction vessel and crystallized at an ambient temperature of 92° C. with stirring. After completion of the crystallization, a dry product was obtained by carrying out the post treatment in the manner as described in Example 5. From the results of the X-ray diffractometry, it was found that when crystallization was carried out under standing conditions, the product was amorphous and that when crystallization was carried out with stirring, the main product was a mixture of gmelinite and phillipsite and no faujasite zeolite was formed.

COMPARATIVE EXAMPLE 6

A starting slurry for crystallization having the same composition as that of the slurry used in Example 1 was prepared in the same manner as described in Example 1 except that the transparent faujasite germ solution used in Example 1 was not used but the respective starting materials constituting the faujasite germ solution used in Example 1 were independently added to the reaction mixture slurry.

Then, 50 g as calculated as the anhydride of the faujasite zeolite having an $SiO_2/Al_2O_3$ molar ratio of 5.5, which was obtained in Example 1, was added as the seed to the above-mentioned slurry. The mixture was maintained at an ambient temperature of 30° C. for 1 hour. The crystallization and post treatment were carried out in the same manner as described in Example 1 to obtain a dry product. From the results of the X-ray diffractometry, it was found that phillipsite and gmelinite were simultaneously formed and the degree of crystallization of the dry product was 86%.

We claim:

1. A process for the preparation of a faujasite zeolite wherein a reaction mixture comprising a silica source, an alumina source and an alkali metal source is crystallized at an elevated temperature, characterized in that a transparent faujasite germ solution is incorporated in the reaction mixture to be crystallized, and the reaction mixture having the transparent faujasite germ solution incorporated therein is then crystallized with stirring, said transparent faujasite germ solution being obtained by mixing and aging an aqueous solution of an alkali metal silicate, an aqueous solution of an alkali metal aluminate and an aqueous solution of an alkali metal hydroxide and having an oxide molar composition represented by the following oxide molar ratios:

$SiO_2/Al_2O_3 = 8$ to 14, $M_2O/Al_2O_3 = 7$ to 30, and $H_2O/M_2O = 10$ to 14, wherein M represents an alkali metal, and the amount of said transparent faujasite germ solution being 1% to 30% by weight as $Al_2O_3$ based on the resulting faujasite zeolite.

2. A process for the preparation of a faujasite zeolite according to claim 1, wherein said transparent faujasite germ solution is obtained by mixing an aqueous solution of an alkali metal silicate, an aqueous solution of an alkali metal aluminate and an aqueous solution of an alkali metal hydroxide and then aging the mixture at a temperature of 20° C. to 60° C. for 10 minutes to 6 hours with stirring.

3. A process for the preparation of a faujasite zeolite according to claim 1, wherein the reaction mixture is an amorphous aluminosilicate homogeneous phase compound obtained by continuously reacting an aqueous solution of an alkali metal silicate and an aluminum-containing aqueous solution by simultaneously and continuously feeding both the aqueous solutions at a constant ratio into a reactor.

* * * * *